United States Patent
Miyoshi et al.

(10) Patent No.: US 9,158,969 B2
(45) Date of Patent: Oct. 13, 2015

(54) INFORMATION PROCESSING DEVICE, SERVER SYSTEM, IMAGE PROCESSING SYSTEM, AND INFORMATION STORAGE DEVICE

(75) Inventors: Takashi Miyoshi, Atsugi (JP); Akio Kosaka, Hachioji (JP); Hidekazu Iwaki, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 514 days.

(21) Appl. No.: 13/490,778

(22) Filed: Jun. 7, 2012

(65) Prior Publication Data

US 2012/0320224 A1      Dec. 20, 2012

(30) Foreign Application Priority Data

Jun. 14, 2011   (JP) .................................. 2011-132390

(51) Int. Cl.
| | |
|---|---|
| *H04N 5/232* | (2006.01) |
| *G06K 9/00* | (2006.01) |
| *H04N 5/217* | (2011.01) |
| *H04N 21/2187* | (2011.01) |
| *H04N 21/274* | (2011.01) |
| *H04N 21/4223* | (2011.01) |

(52) U.S. Cl.
CPC ............ *G06K 9/00671* (2013.01); *H04N 5/217* (2013.01); *H04N 5/23206* (2013.01); *H04N 5/23258* (2013.01); *H04N 5/23267* (2013.01); *H04N 21/2187* (2013.01); *H04N 21/274* (2013.01); *H04N 21/4223* (2013.01)

(58) Field of Classification Search
None
See application file for complete search history.

(56) References Cited

U.S. PATENT DOCUMENTS

2007/0132856 A1* 6/2007 Saito et al. ............... 348/208.99

FOREIGN PATENT DOCUMENTS

| JP | A-5-316404 | 11/1993 |
|---|---|---|
| JP | 2007251299 A | 9/2007 |
| JP | A-2009-302762 | 12/2009 |
| JP | 2010219581 A | 9/2010 |

OTHER PUBLICATIONS

Japanese Office Action dated Mar. 17, 2015 received in Application No. JP2011-132390 together with an English translation.

* cited by examiner

*Primary Examiner* — Twyler Haskins
*Assistant Examiner* — Angel L Garces-Rivera
(74) *Attorney, Agent, or Firm* — Scully, Scott, Murphy & Presser, PC

(57) ABSTRACT

An information processing device (first processing device) includes a captured image acquisition section that acquires a captured image from an imaging section (imaging device), a trimming range setting section that sets a trimming range to the captured image acquired by the captured image acquisition section, the trimming range corresponding to an image processing target area that is processed by a server system (second processing device), and a communication section that transmits image information to the server system via a network, the image information being information about an area of the captured image that has been set as the trimming range by the trimming range setting section.

16 Claims, 14 Drawing Sheets

CAMERA IMAGING RANGE

HIGH-FREQUENCY BLUR

LOW-FREQUENCY BLUR

LOW-FREQUENCY MOVEMENT

CAMERA IMAGING RANGE

HIGH-FREQUENCY SMALL-AMPLITUDE OBJECT MOTION

LOW-FREQUENCY OBJECT MOTION

LOW-FREQUENCY MOVEMENT

CMOS DISTORTION DUE TO PANNING
(ROLLING SHUTTER DISTORTION)

CMOS DISTORTION DUE TO PANNING
(ROLLING SHUTTER DISTORTION)

CMOS DISTORTION DUE TO PANNING
(ROLLING SHUTTER DISTORTION) + LENS DISTORTION

STATIONARY

CMOS DISTORTION DUE TO TRAVEL

FIG. 18B WAVEFORM OUTPUT FROM POSTURE MEASURING DEVICE DURING WALKING

FIG. 18C WAVEFORM OF LOW-FREQUENCY COMPONENT DUE TO WALKING

FIG. 18D (B)−(C)=WAVEFORM OF HIGH-FREQUENCY COMPONENT

FIG. 18E FREQUENCY COMPONENT DISTRIBUTION OBTAINED BY FOURIER TRANSFORM AND LOW-FREQUENCY COMPONENT TRANSMITTED TO SERVER (FREQUENCY REGION OF LOW-FREQUENCY COMPONENT DUE TO WALKING)

INFORMATION PROCESSING DEVICE, SERVER SYSTEM, IMAGE PROCESSING SYSTEM, AND INFORMATION STORAGE DEVICE

Japanese Patent Application No. 2011-132390 filed on Jun. 14, 2011, is hereby incorporated by reference in its entirety.

BACKGROUND

The present invention relates to an information processing device, a server system, an image processing system, an information storage device, and the like.

A wearable camera is configured to capture a video (moving image) using a camera attached to a body. A known wearable camera may be configured so that a video is recorded in a built-in storage device, and transferred to a personal computer or the like as a file to obtain video data. A wearable camera is not provided with an image stabilization function, and priority is given to record dynamic motion.

For example, electronic image stabilization technology disclosed in JP-A-5-316404 has been known as an image stabilization process. In recent years, a camcoder may be provided with an optical or electronic image stabilization function that deals with a low frequency and a large amplitude and can correct a blur due to walking (active mode or dynamic mode) in addition to a fine image stabilization function. Specifically, the image stabilization process has been configured to correct a high-frequency blur component and a long-period blur due to walking.

A known wearable camera is configured to perform image processing in stand-alone mode. A wearable camera cannot implement a leveling process (tilt or roll axis) and a process that reduces a change in camera position due to a body motion with an arm. Therefore, it is necessary to perform a flame adjustment process and a blur correction process by trimming an image captured using a super-wide angle lens, or using a stabilizer or a pan/tilt/roll camera platform.

A video phone function of a mobile phone transmits a compressed low-resolution image using a limited band.

In order to provide a consumer wearable camera, it is necessary to develop image stabilization technology for capturing a high-quality image that is easy to observe and allows easy automatic editing utilizing a scene recognition function. For example, JP-A-2009-302762 discloses a technique in which a processing target image and blur correction information are transmitted to a server via a network, and the server performs a blur correction process.

SUMMARY

According to one aspect of the invention, there is provided an information processing device comprising:

a captured image acquisition section that acquires a captured image from an imaging section;

a trimming range setting section that sets a trimming range to the captured image acquired by the captured image acquisition section, the trimming range corresponding to an image processing target area that is processed by a server system; and a communication section that transmits image information to the server system via a network, the image information being information about an area of the captured image that has been set as the trimming range by the trimming range setting section.

According to another aspect of the invention, there is provided a server system comprising:

a communication section that communicates with an information processing device via a network; and an image processing section that performs image processing, the communication section receiving image information and a parameter when the information processing device has set a trimming range to a captured image acquired from an imaging section, and transmitted the image information about an area that corresponds to the trimming range and the parameter used when setting the trimming range via the network, and the image processing section performing a correction process on the received image information based on the received parameter.

According to another aspect of the invention, there is provided an image processing system comprising:

an information processing device; and a server system, the information processing device including:

a captured image acquisition section that acquires a captured image from an imaging section;

a trimming range setting section that sets a trimming range to the captured image acquired by the captured image acquisition section, the trimming range corresponding to an image processing target area that is processed by the server system; and a first communication section that transmits image information to the server system via a network, the image information being information about an area of the captured image that has been set as the trimming range by the trimming range setting section, and the server system including:

a second communication section that receives image information about an area that corresponds to the trimming range set to the captured image by the information processing device, and a parameter used when setting the trimming range from the information processing device via the network; and an image processing section that performs a correction process on the image information based on the parameter.

According to another aspect of the invention, there is provide an information processing device comprising:

a captured image acquisition section that acquires a captured image from an imaging section;

a parameter setting section that sets a parameter used when performing a blur correction process on the captured image acquired by the captured image acquisition section; and a communication section that transmits image information about the captured image and the parameter to a server system via a network.

According another aspect of the invention, there is provided an information storage device storing a program that causes a computer to function as:

a captured image acquisition section that acquires a captured image from an imaging section;

a trimming range setting section that sets a trimming range to the captured image acquired by the captured image acquisition section, the trimming range corresponding to an image processing target area that is processed by a server system; and a communication section that transmits image information to the server system via a network, the image information being information about an area of the captured image that has been set as the trimming range by the trimming range setting section.

BRIEF DESCRIPTION OF THE DRAWINGS

FIGS. 18A to 18E are views illustrating a low-frequency blur and a high-frequency blur.

DESCRIPTION OF EXEMPLARY EMBODIMENTS

Figure 1:
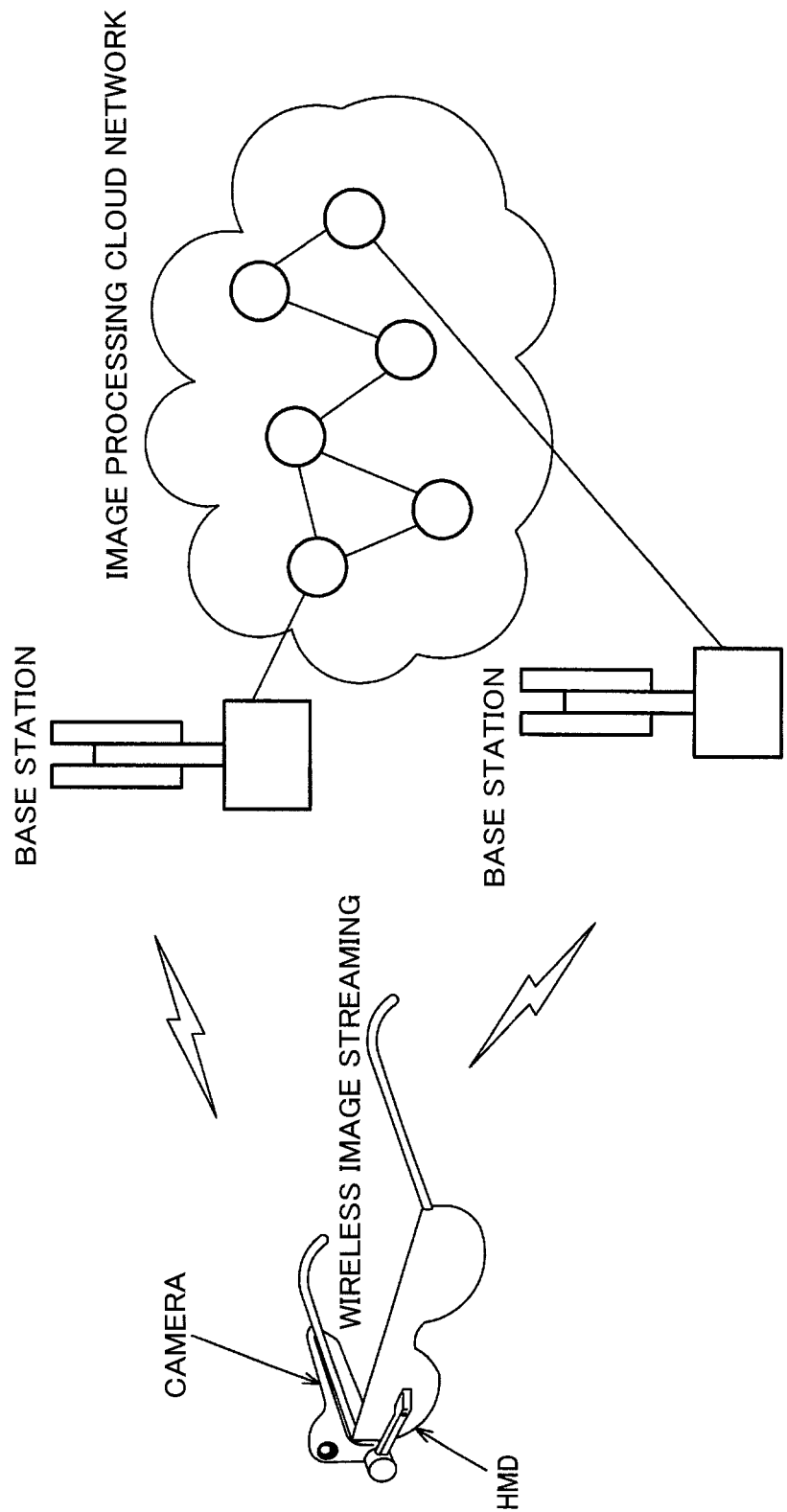
FIG. 1 illustrates a system configuration example according to one embodiment of the invention.

Several aspects of the invention may provide an information processing device, a server system, an image processing system, an information storage device, and the like that prevent a situation in which a heavy load is imposed on a network band by setting a trimming range to a captured image, and transmitting image information within the trimming range to a server system.

Several aspects of the invention may provide an information processing device, a server system, an image processing system, an information storage device, and the like that perform distributed image processing by transmitting image information, to which a parameter used for a blur correction process is added, to a server system that performs image processing.

According to one embodiment of the invention, there is provided an information processing device comprising:

a captured image acquisition section that acquires a captured image from an imaging section;

a trimming range setting section that sets a trimming range to the captured image acquired by the captured image acquisition section, the trimming range corresponding to an image processing target area that is processed by a server system; and a communication section that transmits image information to the server system via a network, the image information being information about an area of the captured image that has been set as the trimming range by the trimming range setting section.

The information processing device sets the trimming range to the captured image, and transmits the image information about the area that has been set as the trimming range to the server system. The data size of the image information transmitted via the network can be reduced by setting the trimming range to be smaller than the captured image, for example. This makes it possible to prevent a situation in which a heavy load is imposed on the network band, for example.

In the information processing device, the trimming range setting section may set an area that includes a blur correction area used when correcting a blur of the captured image as the trimming range.

According to this feature, since an area that includes the blur correction area can be transmitted to the server system, the server system can perform the blur correction process.

The information processing device may further comprise:

an information acquisition section that acquires tilt blur information used for a tilt blur correction process that corrects a tilt blur due to the imaging section, the trimming range setting section may set the trimming range based on the tilt blur information.

This makes it possible to set a trimming range that enables correction of a tilt blur.

The information processing device may further comprise:

a sensor information acquisition section that acquires sensor information from a motion sensor of the imaging section, the information acquisition section may acquire the tilt blur information based on the sensor information, and the trimming range setting section may set the trimming range based on the tilt blur information.

This makes it possible to acquire the tilt blur information using the sensor information, and set the trimming range.

In the information processing device, the information acquisition section may acquire the tilt blur information based on object tilt information about an object within the captured image, and the trimming range setting section may set the trimming range based on the tilt blur information.

This makes it possible to acquire the tilt blur information using the object information, and set the trimming range.

In the information processing device, the communication section may add the tilt blur information to the image information about the area that has been set as the trimming range, and may transmit the resulting image information to the server system.

According to this feature, since the parameter used when setting the trimming range can be added to the image information and transmitted to the server system, image processing performed by the server system can be simplified.

The information processing device may further comprise:

an information acquisition section that acquires translation blur information used for a translation blur correction process that corrects a translation blur due to the imaging section, the trimming range setting section may set the trimming range based on the translation blur information.

This makes it possible to set a trimming range that enables correction of a translation blur.

The information processing device may further comprise:

a sensor information acquisition section that acquires sensor information from a motion sensor of the imaging section, the information acquisition section may acquire the translation blur information based on the sensor information, and the trimming range setting section may set the trimming range based on the translation blur information.

This makes it possible to acquire the translation blur information using the sensor information, and set the trimming range.

In the information processing device, the information acquisition section may acquire the translation blur information based on object translation information about an object within the captured image, and the trimming range setting section may set the trimming range based on the translation blur information.

This makes it possible to acquire the translation blur information using the object information, and set the trimming range.

In the information processing device, the trimming range setting section may set a second trimming range employed when performing the translation blur correction process to be larger than a first trimming range employed when not performing the translation blur correction process by a translation blur amount specified by the translation blur information.

It is possible to set a trimming range that can deal with a translation blur by setting the trimming range employed when performing the translation blur correction process to be larger than the trimming range employed when not performing the translation blur correction process by the translation blur amount.

In the information processing device, the communication section may add the translation blur information to the image information about the area that has been set as the trimming range, and may transmit the resulting image information to the server system.

According to this feature, since the parameter used when setting the trimming range can be added to the image information and transmitted to the server system, image processing performed by the server system can be simplified.

In the information processing device, the trimming range setting section may acquire blur determination information used to determine whether the translation blur due to the imaging section is a high-frequency blur or a low-frequency blur, and may enlarge the trimming range when it has been determined that the translation blur is the low-frequency blur based on the acquired blur determination information as compared with a case where it has been determined that the translation blur is the high-frequency blur.

This makes it possible to set an area having an appropriate size as the trimming range depending on whether the translation blur is a low-frequency blur or a high-frequency blur.

In the information processing device, the server system may generate the blur determination information based on the image information received via the communication section, and the trimming range setting section may receive the blur determination information generated by the server system via the network.

According to this feature, the server system can generate the blur determination information used to determine whether the translation blur is a high-frequency blur or a low-frequency blur, and the information processing device can set the trimming range by receiving the blur determination information generated by the server system.

In the information processing device, the trimming range setting section may set an area that includes a distortion correction area used when correcting a distortion of the captured image as the trimming range.

This makes it possible to set a trimming range that enables correction of a distortion in addition to a blur.

In the information processing device, the distortion of the captured image may be a rolling shutter distortion due to an image sensor of the imaging section.

This makes it possible to set a trimming range that enables correction of a rolling shutter distortion due to the image sensor.

In the information processing device, the distortion of the captured image may be a distortion due to an image sensor of the imaging section.

This makes it possible to set a trimming range that enables correction of a distortion due to the image sensor.

According to another embodiment of the invention, there is provided a server system comprising:

a communication section that communicates with an information processing device via a network; and an image processing section that performs image processing, the communication section receiving image information and a parameter when the information processing device has set a trimming range to a captured image acquired from an imaging section, and transmitted the image information about an area that corresponds to the trimming range and the parameter used when setting the trimming range via the network, and the image processing section performing a correction process on the received image information based on the received parameter.

This makes it possible to implement a server system that can perform the correction process on the image information by receiving the image information about an area set as the trimming range and the parameter used when setting the trimming range from the information processing device. This makes it possible to for the information processing device and the server system to perform the correction process in cooperation.

The server system may further comprise:

a blur determination information generation section that generates blur determination information used to determine whether a blur included in the image information is a high-frequency blur or a low-frequency blur having a frequency lower than that of the high-frequency blur based on the image information, the communication section may transmit the blur determination information generated by the blur determination information generation section to the information processing device via the network.

This makes it possible for the server system to generate the blur determination information.

According to another embodiment of the invention, there is provided an image processing system comprising:

an information processing device; and a server system, the information processing device including:

a captured image acquisition section that acquires a captured image from an imaging section;

a trimming range setting section that sets a trimming range to the captured image acquired by the captured image acquisition section, the trimming range corresponding to an image processing target area that is processed by the server system; and a first communication section that transmits image information to the server system via a network, the image information being information about an area of the captured image that has been set as the trimming range by the trimming range setting section, and the server system including:

a second communication section that receives image information about an area that corresponds to the trimming range set to the captured image by the information processing device, and a parameter used when setting the trimming range from the information processing device via the network; and an image processing section that performs a correction process on the image information based on the parameter.

This makes it possible to implement an image processing system in which the image correction process and the server system perform the image correction process in cooperation.

According to another embodiment of the invention, there is provided an information processing device comprising:

a captured image acquisition section that acquires a captured image from an imaging section;

a parameter setting section that sets a parameter used when performing a blur correction process on the captured image acquired by the captured image acquisition section; and a communication section that transmits image information about the captured image and the parameter to a server system via a network.

This makes it possible to implement an information processing device that facilitates image processing performed by the server system by adding the parameter to the image information, and transmitting the resulting image information to the server system.

According to another embodiment of the invention, there is provided an information storage device storing a program that causes a computer to function as:

a captured image acquisition section that acquires a captured image from an imaging section;

a trimming range setting section that sets a trimming range to the captured image acquired by the captured image acquisition section, the trimming range corresponding to an image processing target area that is processed by a server system; and a communication section that transmits image information to the server system via a network, the image information being information about an area of the captured image that has been set as the trimming range by the trimming range setting section.

Exemplary embodiments of the invention are described below. Note that the following exemplary embodiments do not in any way limit the scope of the invention laid out in the claims. Note also that all elements of the following exemplary embodiments should not necessarily be taken as essential elements of the invention.

1. Method

A method according to several embodiments of the invention is described below. An electronic blur correction process illustrated in FIG. 19 has been known. Specifically, an image that is larger than the display image is acquired, and an appropriate area of the acquired image is trimmed away (e.g., an area indicated by A1 is cropped). An image in which the object appears to be stationary can be displayed by appropriately setting the trimming area corresponding to the motion of the object.

Since it is difficult to horizontally hold an imaging device (e.g., wearable camera) that is worn by the user as compared with an imaging device that is held with the hand, the amount of blur tends to increase when using such an imaging device. Therefore, it is important to perform the blur correction process in order to provide a natural image (moving image (video)) that is convenient for the viewer.

However, since it is desirable to reduce the size of a wearable camera and a wearable device, it may be necessary to simplify the configuration of such a device. Therefore, it may be difficult for the wearable device to perform heavy-load processing such as the electronic blur correction process.

This problem may be solved by transmitting an image acquired by a wearable camera via a network, and performing image processing using a cloud network or the like (see FIG. 1). In this case, since it suffices that the wearable device (HMD in FIG. 1) include a communication section that communicates with the network (i.e., the wearable device need not perform heavy-load processing), the configuration of the wearable device can be simplified.

However, another problem occurs when implementing such distributed processing. Specifically, since the network band is limited, a heavy load may be imposed on the network band when transmitting the entire image acquired by the wearable camera via the network.

Figure 19:
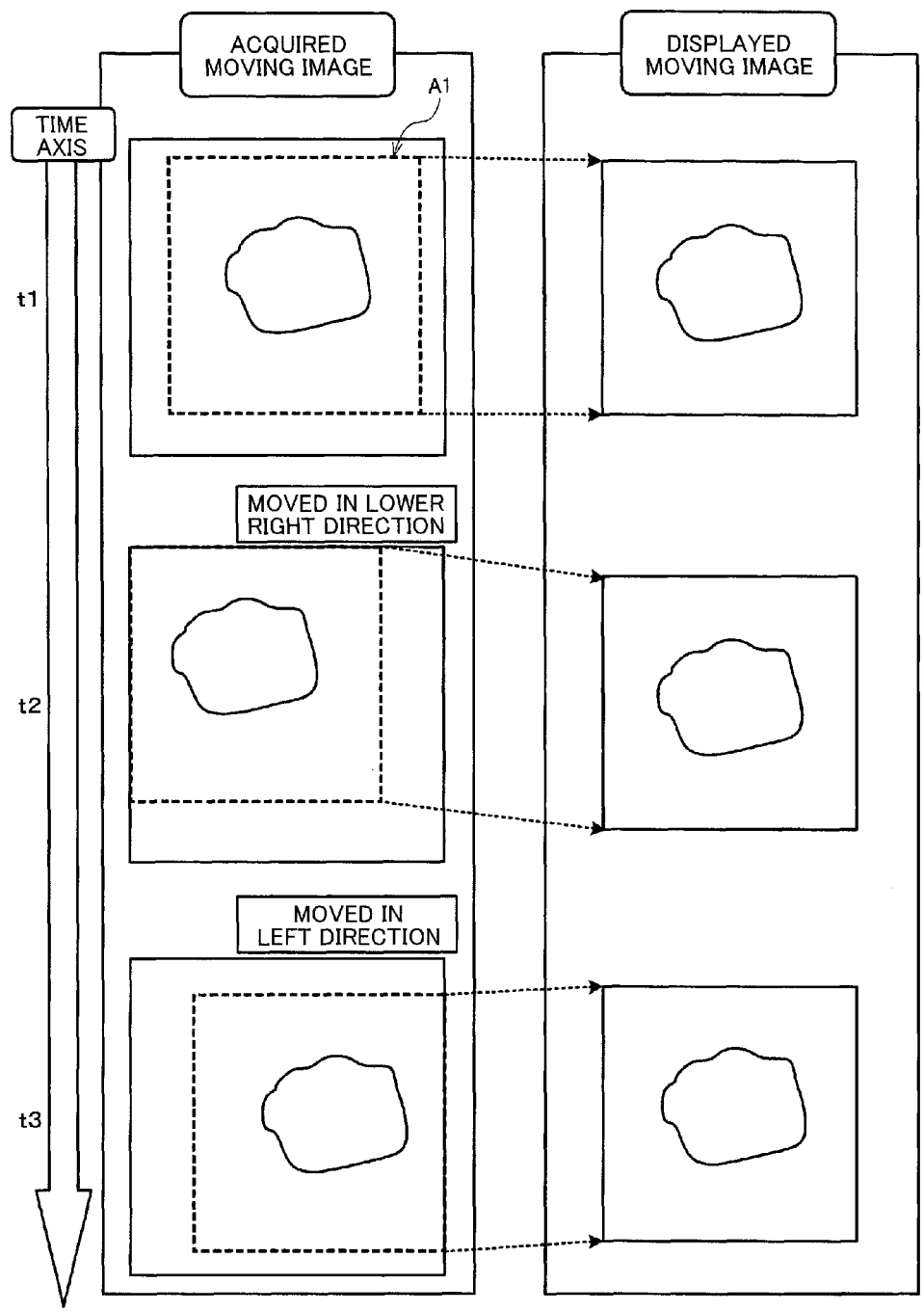
FIG. 19 is a view illustrating an electronic blur correction method.

In order to deal with this problem, several embodiments of the invention employ the following method. The electronic blur correction process illustrated in FIG. 19 acquires an image that is larger than the display image. However, only the area indicated by A1 in FIG. 19 is presented to the user. Since an area including the area indicated by A1 can be specified by utilizing information about the tilt angle (tilt blur), the translation blur amount, and the like, it is possible to limit the processing target area of the image processing section (e.g., image processing cloud network) to an area smaller than the entire captured image to reduce the data size of the image information transmitted via the network. As illustrated in FIG. 5B, only an area FF within a captured image (acquired image) F0 is displayed. Therefore, an area F1 (trimming range) that includes at least the area FF is set using the tilt angle, the translation blur amount, and the like obtained from sensor information and the like, and the area F1 is transmitted to the network instead of the area F0. This makes it possible to prevent a situation in which a heavy load is imposed on the network band. Since it suffices that the wearable device roughly specify and crop an area necessary for the blur correction process instead of performing the blur correction process, the processing load can be reduced. Therefore, the wearable device can be implemented using a simple configuration.

First to third embodiments of the invention and modifications thereof are described below. The first embodiment illustrates a method that sets the trimming range based on a tilt blur and a translation blur of a captured image. The second embodiment illustrates a method that determines whether a translation blur is a high-frequency blur or a low-frequency blur using translation blur frequency information, and sets the trimming range utilizing the determination result. The third embodiment illustrates a method that utilizes information about an object within a captured image. The modifications illustrate a method that sets the trimming range taking account of a distortion of an image in addition to a tilt blur and a translation blur.

2. First Embodiment

FIG. 1 illustrates an image processing system according to the first embodiment. The image processing system according to the first embodiment includes an imaging device, a first processing device (information processing device in a narrow sense), and a second processing device (server system in a narrow sense). FIG. 1 illustrates an example in which the first processing device is a head-mounted display (HMD), the imaging device is a camera attached to the HMD, and the second processing device is a cloud network. Note that the first processing device is not limited to the HMD, and the second processing device is not limited to the cloud network. The first processing device need not necessarily be a device that includes a display section (e.g., HMD) when it is unnecessary to feed the image processing results of the second processing device back to the user who possesses the first processing device.

Figure 2:
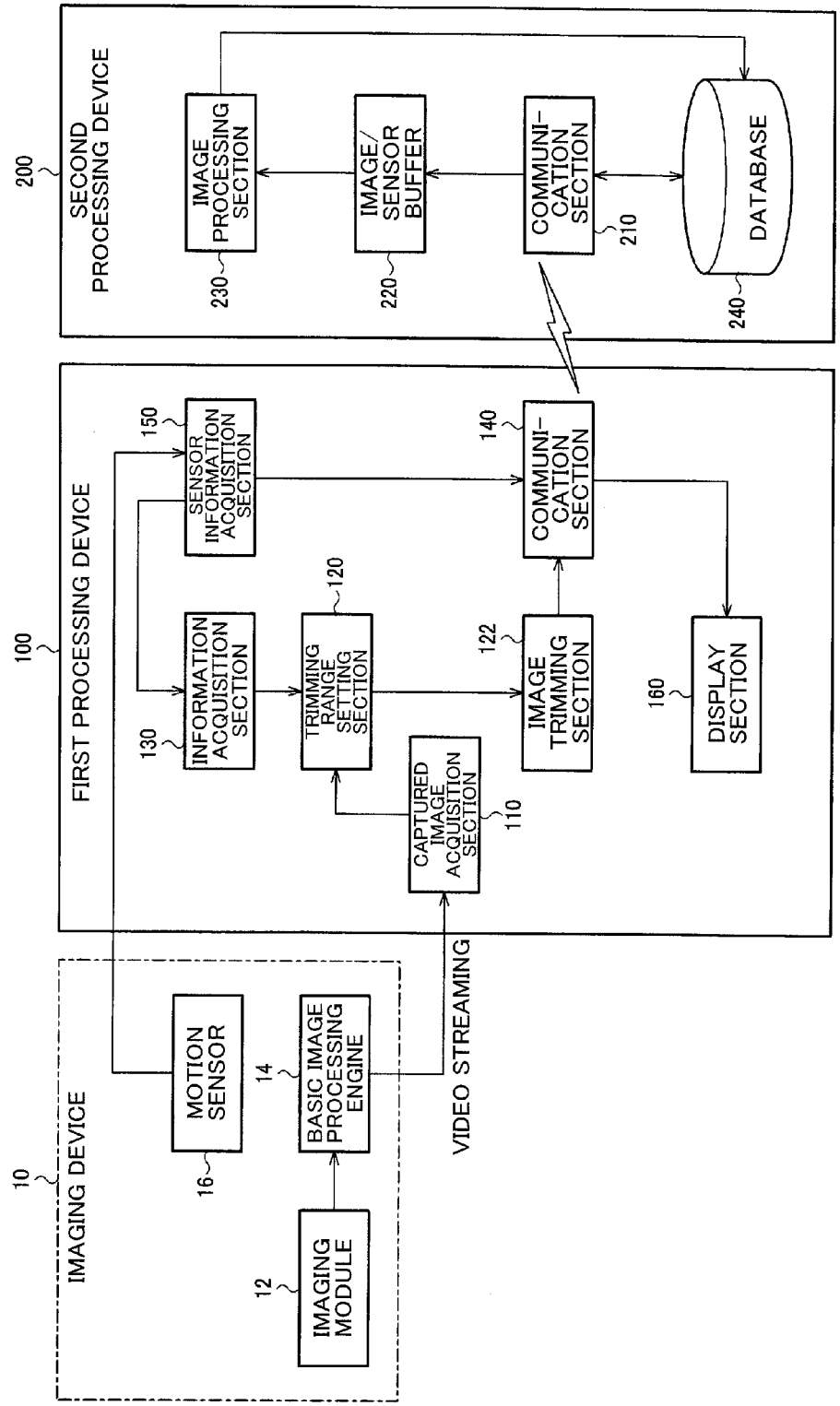
FIG. 2 illustrates a specific system configuration example according to a first embodiment.

The system configuration is described in detail below with reference to FIG. 2. As illustrated in FIG. 2, an imaging device 10 includes an imaging module 12, a basic image processing engine 14, and a motion sensor 16. The imaging module 12 includes an optical system for forming an image, a shutter, an aperture, and an ND filter for adjusting the intensity of light, and an image sensor (e.g., CCD or CMOS). The basic image processing engine 14 performs image processing on a captured image acquired by the imaging module 12 in order to output an image signal via NTSC or digital image transmission. The imaging device 10 may be configured in the same manner as a digital video camera or a digital still camera. The motion sensor 16 acquires information about the motion of the imaging device. The motion sensor 16 may be an acceleration sensor, an angular velocity sensor, a terrestrial magnetism sensor, or the like.

A video stream output from the imaging device 10 is input to a first processing device 100. The first processing device 100 may be configured to convert the input image into a digital image, and process the digital image using a built-in computer that executes a computer program. The first processing device 100 includes a captured image acquisition section 110, a trimming range setting section 120, an image trimming section 122, an information acquisition section 130, a communication section 140, a sensor information acquisition section 150, and a display section 160.

The captured image acquisition section 110 acquires the video stream from the imaging device 10. The trimming range setting section 120 sets a trimming range to the captured image acquired by the captured image acquisition section 110. The details of the trimming range and the trimming range setting method are described later. The image trimming section 122 trims (crops) the captured image using the trimming range set by the trimming range setting section 120, and transmits the resulting image to the communication section 140. The information acquisition section 130 acquires blur information. The term "blur information" used herein refers to tilt blur information, translation blur information, and the like. In the first embodiment, the blur information is acquired based on sensor information acquired by the sensor information acquisition section 150. The communication section 140 transmits image information about the image trimmed (cropped) by the image trimming section 122 and a parameter used when setting the trimming range to a second processing device 200 via a wireless LAN network layer, a cable LAN network layer, or the like. The sensor information acquisition section 150 acquires the sensor information output from the motion sensor 16 of the imaging device 10. The display section 160 displays an image. In the first embodiment, the display section 160 acquires an image subjected to image processing (blur correction process) by the second processing device 200 via the communication section 140, and displays the acquired image. The first processing device 100 may include a buffer memory that temporarily stores an image signal or a sensor signal that is to be processed or transmitted.

The signal transmitted from the communication section 140 of the first processing device 100 is processed by the second processing device 200. The second processing device 200 includes a communication section 210, an image/sensor buffer 220, and an image processing section 230. The video stream processed by the image processing section 230 is stored in a database 240.

The communication section 210 communicates with the first processing device 100 via a wireless LAN network layer, a cable LAN network layer, or the like. The communication section 210 receives the image information about the image trimmed (cropped) using the trimming range, and the parameter (e.g., sensor information) used when setting the trimming range. The communication section 210 transmits the image information about the image processed by the image processing section 230 to the first processing device 100. The image/sensor buffer 220 stores the image information and the sensor information (parameter) received by the communication section 210. The image processing section 230 performs a blur correction process (i.e., image processing). The process performed by the image processing section 230 is described in detail later with reference to FIGS. 5D to 5F, for example. Note that the image processed by the image processing section 230 need not necessarily be transmitted to the first processing device 100. For example, the image processed by the image processing section 230 may be stored in a storage on a network. The second processing device 200 may be implemented by a program, or may be implemented by a distributed processing system on a network.

The trimming range setting section 120 of the first processing device 100 sets the trimming range as described below. It is necessary to set the trimming range taking account of a tilt blur and a translation blur. A tilt blur correction process is performed as described below.

In the first embodiment, the first processing device 100 acquires information in the gravitational direction from an acceleration sensor, and the second processing device 200 performs a leveling correction process around the camera roll axis based on the acquired information (i.e., image stabilization process).

Figure 3:
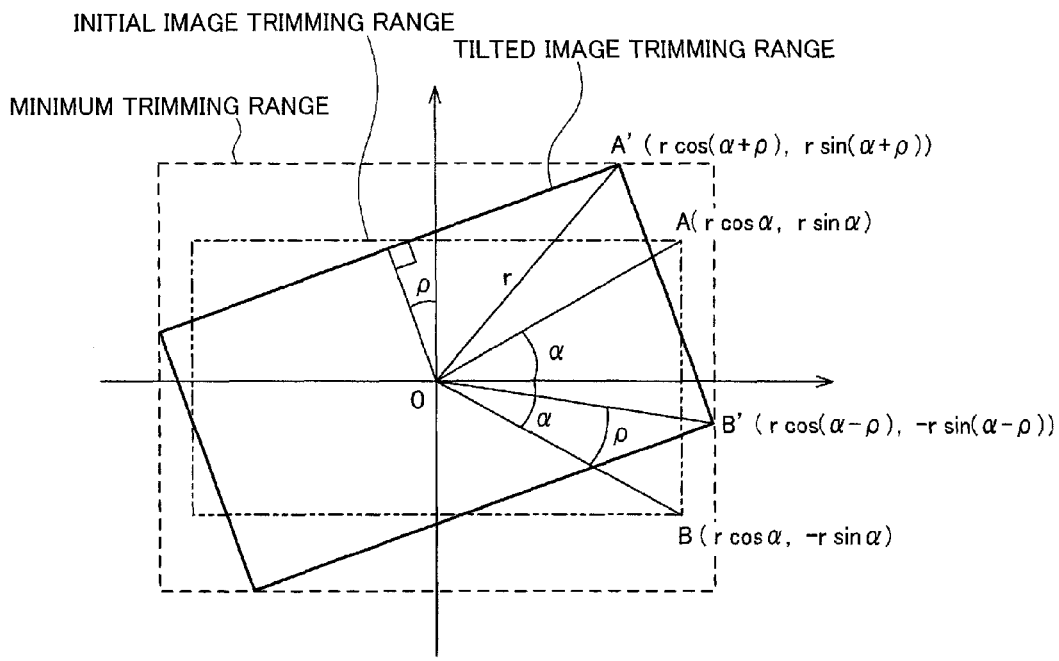
FIG. 3 is a view illustrating a trimming range setting method when performing a tilt blur correction process.

The electronic blur correction process includes acquiring an image that is larger than the display image, and determining an area of the acquired image used as the display image based on the relative motions of the imaging device 10 and the object so that the object appears to be stationary (see FIG. 19). The size of the area used as the display image is determined based on the size of the display image. In FIG. 3, the size of the area used as the display image corresponds to an initial image trimming range. In FIG. 3, an area (initial image trimming range) that should be horizontal with respect to the gravitational direction is tilted due to a tilt blur (see a tilted image trimming range in FIG. 3). It is necessary to set an area that includes at least the tilted image trimming range as the trimming range when performing the tilt correction process.

In the first embodiment, a rectangular area that is horizontal with respect to the gravitational direction is set as the trimming range in order to simplify the process. Specifically, a rectangular area that includes the tilted image trimming range is set as the trimming range. In order to prevent a situation in which a heavy load is imposed on the network band, it is necessary to set the smallest rectangular area that includes the tilted image trimming range instead of merely setting a rectangular area that includes the tilted image trimming range. A minimum trimming range illustrated in FIG. 3 corresponds to the smallest rectangular area that includes the tilted image trimming range.

The minimum trimming range is set as described below. Note that the tilt blur is indicated by ρ. The center of the image display range is referred to as origin, and the right vertices of the image display range are referred to as A and B. When the number of pixels of the display range in the vertical direction and the number of pixels of the display range in the horizontal direction are respectively referred to as U and V, the distance r from the origin to each vertex of the display range is shown by the following expression (1).

$$r = \left(\frac{U}{2}\right)^2 + \left(\frac{V}{2}\right)^2 \quad (1)$$

The rotation blur is corrected by rotating the image trimming range around the roll axis by the tilt blur ρ (°). In this case, an area having a size equal to or larger than that of the minimum trimming range (U'min, V'min) (i.e., a rectangular area that is circumscribed to the display range) is cropped and transmitted. The values U'min and V'min are calculated by the following expressions (2) and (3) using the coordinates of the vertices A' and B'.

$$U'_{min} = 2r \cos(\alpha - \rho) \quad (2)$$

$$V'_{min} = 2r \sin(\alpha + \rho) \quad (3)$$

When the vertical direction of the image coincides with the gravitational direction, it is possible to stably observe the image displayed on a large-screen TV due to the absence of a blur around the roll axis. However, the user may suffer from visually induced motion sickness when the camera (e.g., head-mounted wearable camera) moves to a large extent due to a body motion. Therefore, it is necessary to correct a blur around the roll axis.

The angle α formed by the u-axis and a straight line that connects the origin and each vertex (determined by the aspect ratio of the image) is calculated, and the image trimming range is calculated by the expressions (1) to (3) using the angle α and the blur angle ρ around the camera optical axis of the gravity sensor with respect to the reference position (see FIG. 3) so that the vertical direction coincides with the v direction.

Note that the first processing device crops the image along a range obtained by adding values ΔU and ΔV to the image trimming range taking account of a translation blur and the monotonical movement of the image due to a panning or tilt operation.

Figure 4:
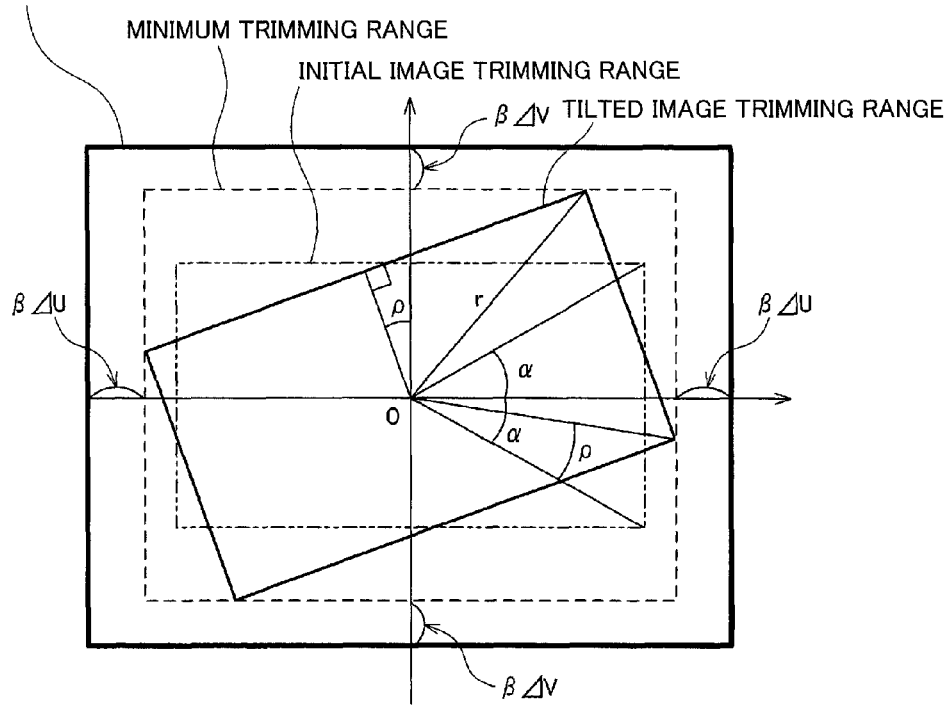
FIG. 4 is a view illustrating a trimming range setting method when performing a translation blur correction process.

A translation blur correction process is described below. A translation blur is corrected using a normal electronic blur correction process. The first processing device 100 calculates a correction allowance by multiplying the values ΔU and ΔV by β, and crops the image using the correction allowance. The values ΔU and ΔV are calculated from a translation component output from the acceleration sensor. The first processing device 100 determines the trimming range based on the values ΔU and ΔV. The value β is a safety factor of the electronic blur correction process. The electronic blur correction process can be performed when the value β is 1. It is preferable that the value β be about 2 in order to stabilize the process and prevent a situation in which the image is unnecessarily trimmed. FIG. 4 illustrates the relationship between the trimming range and the value β.

The image information about the image that has been cropped taking account of the tilt blur and the translation blur is transmitted to the second processing device 200 via the communication section 140. The amount of information transmitted via the network can be reduced by thus transmitting the cropped image as compared with the case of transmitting the entire image.

It is desirable to simply crop (trim) the image in a rectangular shape along the coordinates in which the pixels of the reference image are arranged in the vertical direction and the horizontal direction in order to reduce the image processing load. When using a CMOS sensor as the imaging module, it is possible to acquire image signals that indicate a rectangular image by designating the readout start address and the readout end address from the sensor.

A change in the coordinates of the origin O, the value ρ detected by the sensor, the coordinate data of the vertices A' and B', the crop coordinates determined by the first processing device 100, and the value ΔU and ΔV (translation blur correction allowance) are transmitted to the second processing device 200 as parameters (metadata) together with the image data.

The second processing device 200 reads the pixel values for which the rotation and the blur due to the translation blur component are corrected based on the image cropped by the first processing device 100 and the parameters (e.g., crop position data), and calculates the pixel values of the final cropped image. Since it is necessary to interpolate the pixel values, the final cropped image is generated while appropriately utilizing a pixel interpolation technique (e.g., bilinear process or bicubic process). A stable image free from a tilt blur is displayed by sequentially displaying the generated image.

A low-frequency blur when using a plurality of time-series frames (e.g., several seconds) may be calculated by image processing based on the movement of a feature point or the like, transmitted to the first processing device 100 via the communication section 210, and fed back to a change in the coordinates of the origin.

The second processing device 200 may correct a small blur using an electronic blur correction process that moves the trimming range in a straight line, or may sharpen the image that is blurred within a frame using a deblurring filter.

The image processing section 230 of the second processing device 200 performs the following image processing. A change in the image trimming range corresponding to the image trimming process used for the correction process is described below with reference to FIGS. 5A to 5F.

Figure 5A:
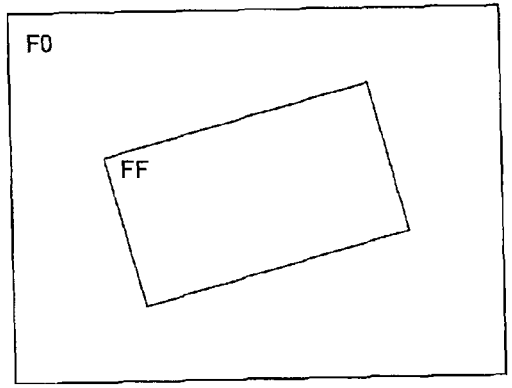
FIGS. 5A to 5F are views illustrating the flow of image processing performed by an information processing device and a server system.

F0 in FIG. 5A indicates the valid pixels of the image sensor. A rectangular area (FF) in the center area is a frame that is subjected to the tilt blur correction process and the translation blur correction process and then displayed/recorded.

The first processing device 100 determines a frame (F1 in FIG. 5B) that includes the frame FF and has the translation blur correction allowance. The image trimming section 122 crops the frame F1, and transmits the resulting frame F1 to the second processing device 200 after adding the parameters (see FIG. 5C).

Figure 5D:
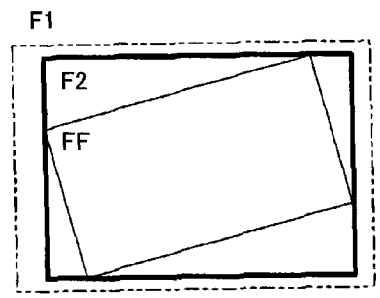
Figure 5B:
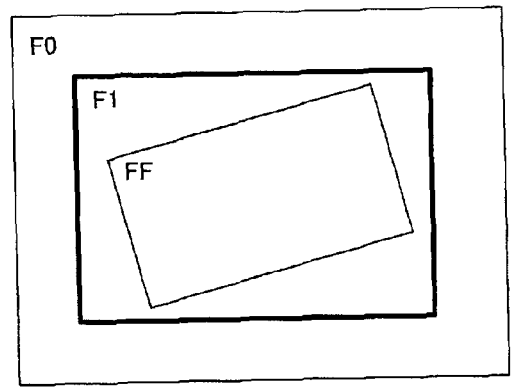
Figure 5E:
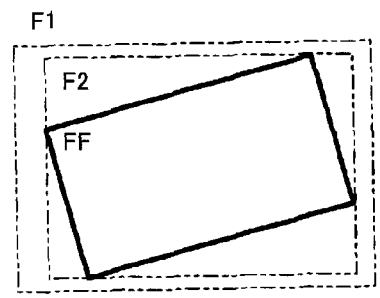
Figure 5C:
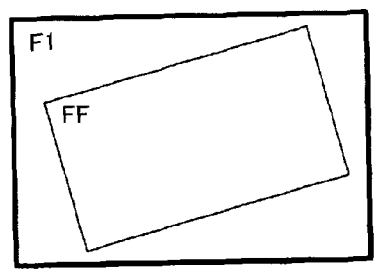
Figure 5F:

The image processing section 230 of the second processing device 200 performs the electronic blur correction process on the frame F1, and crops a frame F2 (see FIG. 5D). The frame FF (see FIG. 5E) that is inscribed to the frame F2 and is rotated by the angle ρ is cropped (see FIG. 5E), and rotated to obtain the final image FFF (FIG. 5F).

According to the first embodiment, the information processing device (first processing device 100) includes the captured image acquisition section 110 that acquires a captured image from the imaging section (imaging device 10), the trimming range setting section 120 that sets the trimming range to the captured image, the trimming range corresponding to an image processing target area that is processed by the server system (second processing device 200), and the communication section 140 that transmits the image information about an area of the captured image that has been set as the trimming range to the server system via a network.

The captured image refers to the entire image formed by the image sensor, and corresponds to the frame F0 illustrated in FIG. 5A. The trimming range set by the trimming range setting section 120 corresponds to the frame F1 illustrated in FIG. 5B. The image processing target area refers to an area that is processed by the image processing section 230 of the server system, and corresponds to the frame F1 illustrated in FIG. 5C. Note that the trimming range need not necessarily coincide with the image processing target area.

It is thus possible to implement an information processing device that sets the trimming range to the captured image, and transmits the image information about an area of the captured image that has been set as the trimming range to the server system via a network. This makes it possible to distribute the information processing device (first processing device 100) that acquires the captured image and the server system (second processing device 200) that performs image processing. Since the information processing device and the server system are connected via a network, the amount of information transmitted via the network can be reduced by setting the trimming range. This makes it possible to prevent a situation in which a heavy load is imposed on the network band.

The trimming range setting section 120 may set an area that includes a blur correction area used when correcting a blur of the captured image as the trimming range.

The blur correction area refers to the area A1 illustrated in FIG. 19, for example. The blur correction area corresponds to the frame FF illustrated in FIG. 5A. The blur correction area also corresponds to the tilted image trimming range illustrated in FIG. 3.

This makes it possible to set an area that includes the blur correction area as the trimming range. The blur correction process can be performed based on the principle of the electronic blur correction process as long as the blur correction area can be transmitted to the image processing section 230. Therefore, the blur correction process can be performed using an area that includes the blur correction area. Note that the trimming range need not necessarily coincide with the blur correction area. Specifically, a rectangular area that is not tilted may be set as the trimming range in order to simplify the process, or the translation blur correction allowance may be provided (see the frame F1 illustrated in FIG. 5B).

The information processing device (first processing device 100) may include the information acquisition section 130 that acquires tilt blur information used to correct a tilt blur due to the imaging section (see FIG. 2). The trimming range setting section 120 may set the trimming range based on the tilt blur information.

This makes it possible to deal with a tilt blur. The user of a digital video camera or the like that is held with the hand of the user spontaneously shoots an image horizontally with respect to the gravitational direction. Therefore, a natural image is obtained even if an intense blur correction process is not performed. However, it is difficult to horizontally shoot an image when using a wearable camera (e.g., head-mounted wearable camera). In particular, the viewer may be given a wrong impression when an image shot using a wearable camera is displayed on a large-screen display, for example. Therefore, it is desirable to provide a natural image to the viewer by correcting a tilt blur.

The information processing device (first processing device 100) may include the sensor information acquisition section 150 that acquires the sensor information from the motion sensor 16 of the imaging section (see FIG. 2). The information acquisition section may acquire the tilt blur information based on the sensor information, and the trimming range setting section 120 may set the trimming range based on the tilt blur information.

This makes it possible to set the trimming range based on the sensor information acquired from the motion sensor 16. A tilt with respect to the gravitational direction can be easily measured using a sensor value obtained by an acceleration sensor or an angular velocity sensor. Therefore, the process can be simplified as compared with the case of detecting a tilt using image processing or the like.

The communication section 140 of the information processing device may add the tilt blur information to the image information about the area that has been set as the trimming range, and may transmit the resulting image information to the server system.

This makes it possible to facilitate image processing performed by the server system. The image information transmitted from the first processing device corresponds to the trimming range that corresponds to the frame F1 (see FIG. 5C). When transmitting only the frame F1 to the server system, the server system must determine (distinguish) a necessary area and an unnecessary area. In this case, heavy-load processing such as an object recognition process is required. If the tilt blur information (e.g., rotation angle $\rho$) is transmitted to the server system as a parameter (metadata) in addition to the frame F1, the server system can easily specify the frame FF from the frame F2 (see FIG. 5E), and can easily obtain the frame FFF (see FIG. 5F) from the frame FF.

The information processing device (first processing device 100) may include the information acquisition section 130 that acquires translation blur information used to correct a translation blur due to the imaging section (see FIG. 2). The trimming range setting section 120 may set the trimming range based on the translation blur information.

This makes it possible to deal with a translation blur. A translation blur almost necessarily occurs due to the motion of the hand of the user (e.g., the motion of a part of the user to which a wearable camera is attached). In this case, the necessary information may be lost due to the translation blur when taking account of only the rotation blur (see FIG. 3). Therefore, it is desirable to provide a translation blur correction allowance ($\beta\Delta u$ and $\beta\Delta V$) (see FIG. 4).

The information processing device (first processing device 100) may include the sensor information acquisition section 150 that acquires the sensor information from the motion sensor 16 of the imaging section (see FIG. 2). The information acquisition section may acquire the translation blur information based on the sensor information, and the trimming range setting section 120 may set the trimming range based on the translation blur information.

This makes it possible to set the trimming range based on the sensor information acquired from the motion sensor 16. A translation blur can be easily measured using a sensor value obtained by an acceleration sensor or an angular velocity sensor. Therefore, the process can be simplified as compared with the case of detecting a translation blur using image processing or the like.

The trimming range setting section 120 may set a second trimming range employed when performing the translation blur correction process to be larger than a first trimming range employed when not performing the translation blur correction process by the translation blur amount specified by the translation blur information.

This makes it possible to appropriately set the scale factor of the second trimming range with respect to the first trimming range based on the translation blur information. More specifically, the translation blur amount ΔU and the translation blur amount ΔV specified by the translation blur information are calculated. The scale factor may be determined directly using the translation blur amount ΔU and the translation blur amount ΔV. In the first embodiment, a flexible correction allowance is provided by utilizing the values βΔU and βΔV, so that a trimming range can be set to have a desired size.

The communication section 140 of the information processing device may add the translation blur information to the image information about the area that has been set as the trimming range, and may transmit the resulting image information to the server system.

This makes it possible to facilitate image processing performed by the server system. Specifically, when transmitting only the image information about the area that has been set as the trimming range to the server system, the server system must (cannot) determine (distinguish) a necessary area and an unnecessary area. It is possible for the server system to easily specify the frame F2 from the frame F1 (see FIG. 5D) by transmitting the translation blur amount ΔU and the translation blur amount ΔV to the server system. It is desirable to also transmit the parameter β to the server system together with the translation blur amount ΔU and the translation blur amount ΔV.

The first embodiment also relates to a server system (second processing device 200) that includes the communication section 210 that receives the image information about an area that corresponds to the trimming range set by the information processing device (first processing device 100) and a parameter used when setting the trimming range via a network, the trimming range being set to the captured image acquired from the imaging section (imaging device 10), and the image processing section 230 that performs the correction process on the image information based on the received parameter.

This makes it possible to implement a server system that operates in cooperation with the information processing device. The server system performs the blur correction process on the image information about the area that corresponds to the trimming range using the image information and the parameter (metadata). This makes it unnecessary for the information processing device to perform heavy-load image processing. Therefore, the configuration of the information processing device can be simplified. This is particularly effective when the information processing device is a wearable device (e.g., HMD).

The first embodiment also relates to an image processing system that includes the information processing device and the server system.

This makes it possible to implement an image processing system that is configured so that an information processing device and a server system operate in cooperation, the information processing device sets only the trimming range, and the server system performs heavy-load image processing (blur correction process). Since the information processing device crops (trims) the image based on the trimming range before transmitting the image via a network, the amount of information transmitted via the network can be reduced. This makes it possible to prevent a situation in which a heavy load is imposed on the network band.

The first embodiment also relates to an information processing device that includes the captured image acquisition section 110 that acquires a captured image from the imaging section (imaging device 10), a parameter setting section that sets a parameter used when performing a blur correction process on the captured image acquired by the captured image acquisition section 110, and the communication section 140 that transmits the image information about the captured image and the parameter to the server system via a network.

This makes it possible to implement an information processing device that transmits the parameter without setting the trimming range. Although an example in which the information processing device and the server system operate in cooperation, and the information processing device crops (trims) the image has been described above, the information processing device may only detect and transmit the parameter without cropping (trimming) the image. This makes it possible to reduce the processing load of the information processing device as compared with the above example.

The first embodiment also relates to a program that causes a computer to function as the captured image acquisition section 110 that acquires a captured image from the imaging section (imaging device 10), the trimming range setting section 120 that sets the trimming range to the captured image, the trimming range corresponding to an image processing target area that is processed by the server system (second processing device 200), and the communication section 140 that transmits image information about an area of the captured image that has been set to the trimming range to the server system via a network.

This makes it possible to implement the process performed by the information processing device using a program (software). The program is stored in an information storage device. The information storage device may be an arbitrary recording medium that is readable by an information processing device or the like, such as an optical disk (e.g., DVD and CD), a magnetooptical disk, a hard disk (HDD), and a memory (e.g., nonvolatile memory and RAM). For example, the program may be stored in an arbitrary recording medium that is readable by a PC or the like, and executed by a processing section (e.g., CPU) of the PC or the like. When using a wearable camera as described in connection with the first embodiment, an information processing device having a reduced size and weight (e.g., mobile phone) may be used. In this case, the program according to the first embodiment may be implemented as an application that is executed by a mobile phone (particularly a smartphone).

3. Second Embodiment

Figure 6:
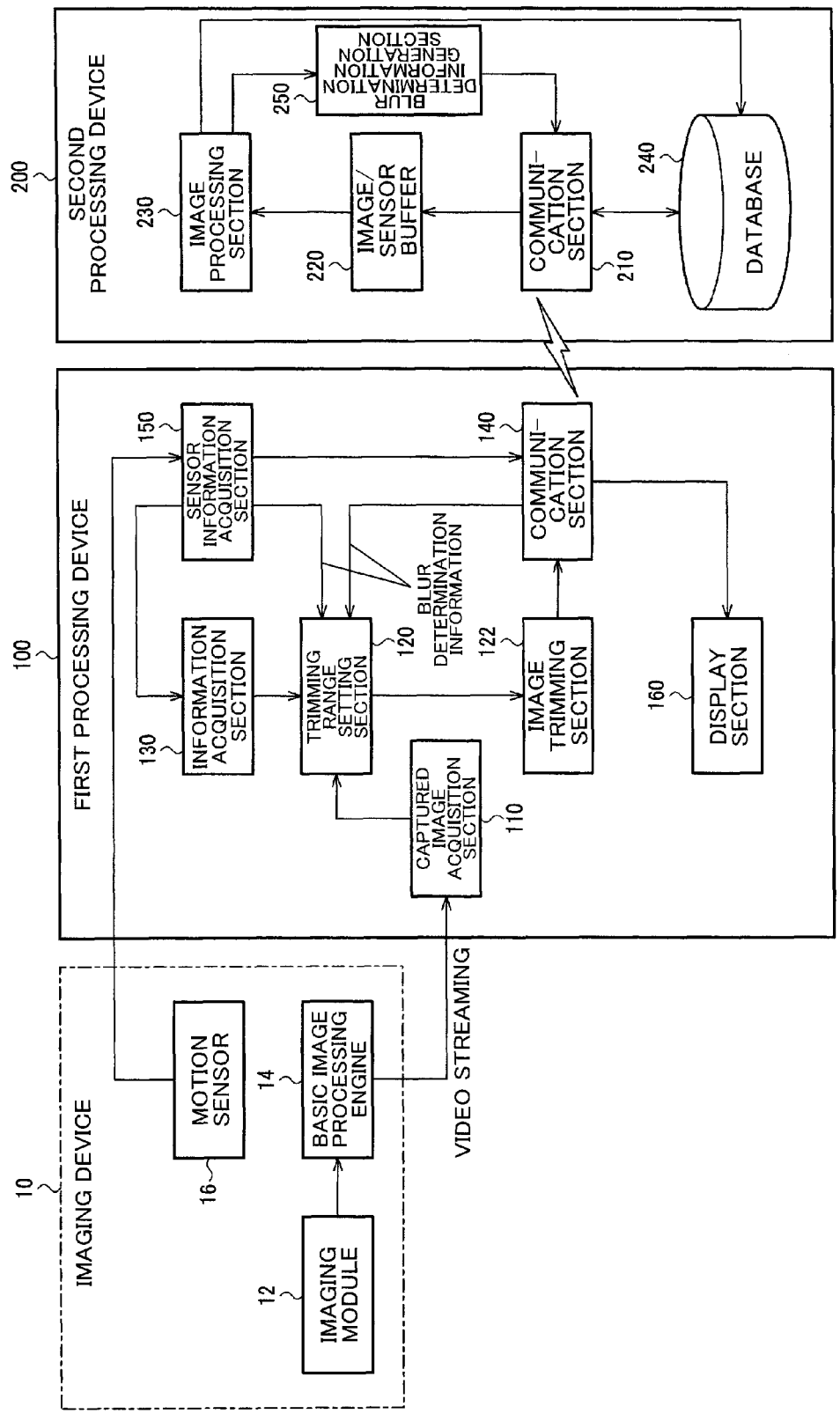
FIG. 6 illustrates a specific system configuration example according to a second embodiment.

An image processing system according to a second embodiment of the invention is described below with reference to FIG. 6. As illustrated in FIG. 6, an imaging device 10 includes an imaging module 12, a basic image processing engine 14, and a motion sensor 16 in the same manner as in the first embodiment.

A video stream output from the imaging device 10 is input to a first processing device 100. The configuration of a first processing device 100 is the same as the configuration of the first processing device 100 according to the first embodiment. Therefore, detailed description of the first processing device 100 is omitted.

An example in which a tilt blur and a translation blur are corrected has been described in connection with the first embodiment. A method that reduces the size of an image transmitted when a translation blur occurs is described below with reference to FIGS. 7A to 7D.

FIGS. 7A to 7D illustrate a camera imaging range (outer rectangular area), a transmission range (rectangular area indicated by a thick line), and an output image size (inner rectangular area). A frame indicated by a two-dot chain line indicates a change in the range of the output image due to a blur.

When a small blur (high-frequency blur) has occurred, it is considered that the relative motion of the object with respect to imaging device 10 is small. Therefore, the transmission range can be reduced (see FIG. 7B). When a blur having a large stroke (low-frequency blur) has occurred, it is necessary to deal with the blur by enlarging the transmission range (see FIG. 7C). When the second processing device 200 corrects a low-frequency blur having a large stroke, it is necessary to transmit the image using a large transmission range (see FIG. 7D).

Since the correction allowance can be significantly reduced by setting the transmission range taking account of the frequency of the translation blur and the like, the size of the image transmitted by a communication device can be reduced.

Whether the translation blur is a high-frequency blur or a low-frequency blur may be determined based on the sensor information acquired by the sensor information acquisition section 150, or may be determined by performing image processing on the image information. For example, blur determination information may be acquired from the sensor information acquisition section 150 (see FIG. 6). The blur determination information acquired from the sensor information acquisition section 150 is information for mainly detecting a high-frequency blur. A blur determination information generation section 250 may generate blur determination information using the image information acquired by the second processing device 200. The blur determination information generated by the blur determination information generation section 250 is information for mainly detecting a low-frequency blur. It is difficult to detect a low-frequency blur using information obtained within a short time since the frequency of the translation blur is low. Therefore, a low-frequency blur may be detected using a plurality of pieces of image information stored in the database 240, for example. The blur determination information generated by the blur determination information generation section 250 is transmitted to the trimming range setting section 120 via the communication section 210 and the communication section 140.

Note that various modifications may be made of each configuration according to the second embodiment. For example, the trimming center may be shifted based on the amount of blur (see the first embodiment) instead of reducing the amount of image information transmitted via a network by enlarging or reducing the image transmission range.

The terms "low-frequency blur" and "high-frequency blur" are defined as follows. Specifically, a horizontal swing motion having a frequency of about 1 Hz or less that occurs due to a vertical motion of the entire body when the user makes a large motion (walking) or moves the legs, or occurs due to a breathing motion is referred to as a low-frequency component (see FIG. 18A). A momentary swing motion that occurs due to a small motion of the head or contact between the foot and the ground is referred to as a high-frequency component.

Figure 18A:
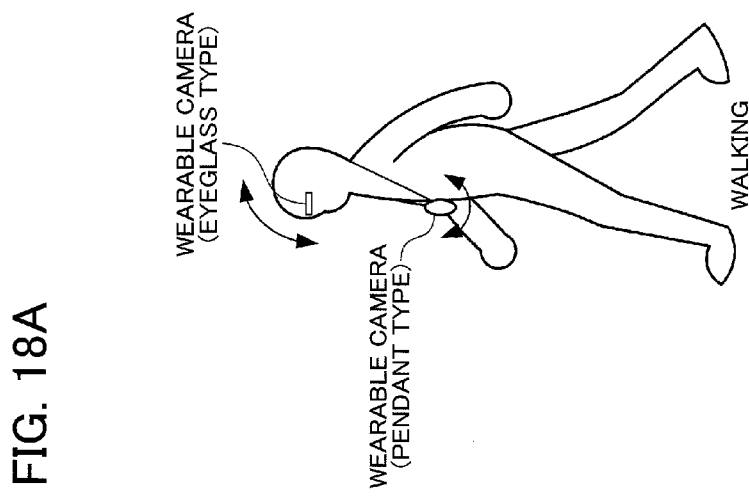
Figure 18A:
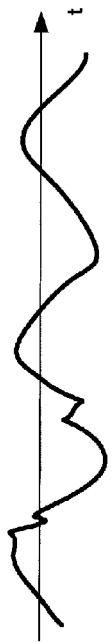
Figure 18A:
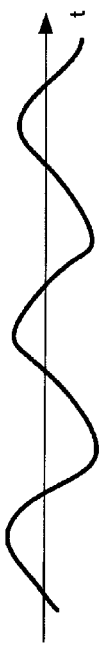
Figure 18A:
Figure 18A:
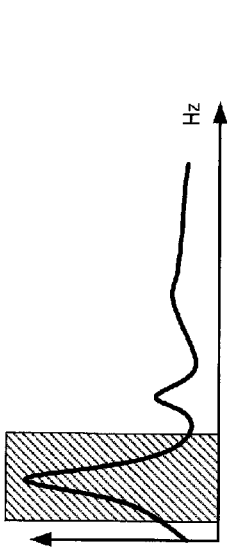

For example, a waveform illustrated in FIG. 18B is obtained from the sensor information when the user walks (see FIG. 18A). The waveform illustrated in FIG. 18B is a resultant waveform of the waveform of a low-frequency component due to walking illustrated in FIG. 18C and the waveform of a high-frequency component illustrated in FIG. 18D. FIG. 18E illustrates a waveform obtained by Fourier transforming the waveform illustrated in FIG. 18B. A shaded area in FIG. 18E corresponds to the low-frequency component.

Since a change in posture can be detected from the displacement and rotation detected by a gyrosensor, a horizontal tilt detected by a gravitational acceleration sensor, a blur calculated from the moving vector of the feature quantity of the image, and the like, a low-frequency component and a high-frequency component can be extracted using the resulting information. The correction process using the extracted components may be performed by a server or a terminal.

For example, a camera terminal (first processing device 100) may calculate high-frequency blur information, and utilize the high-frequency blur information for cropping the image for performing the electronic blur correction process, and a server (second processing device 200) may calculate low-frequency blur information, and feed the low-frequency blur information back to the camera terminal to enlarge the image trimming range.

According to the second embodiment, the trimming range setting section 120 of the information processing device acquires the blur determination information used to determine whether a translation blur is a high-frequency blur or a low-frequency blur. The trimming range setting section 120 may enlarge the trimming range when it has been determined that the translation blur is a low-frequency blur as compared with the case where it has been determined that the translation blur is a high-frequency blur.

Figure 7A:
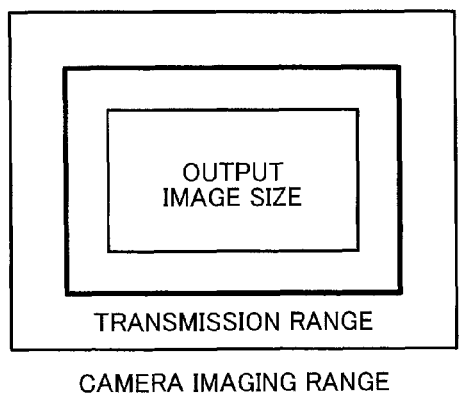
FIGS. 7A to 7D are views illustrating a method that changes a trimming range corresponding to the characteristics of a translation blur.
Figure 7B:
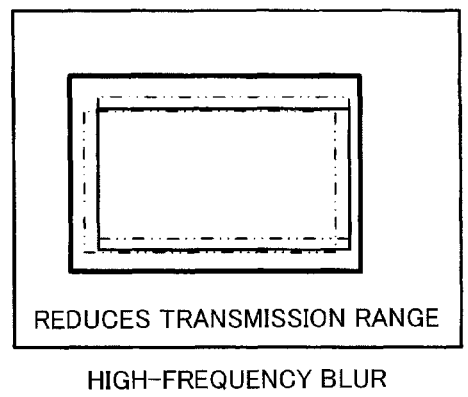
Figure 7C:
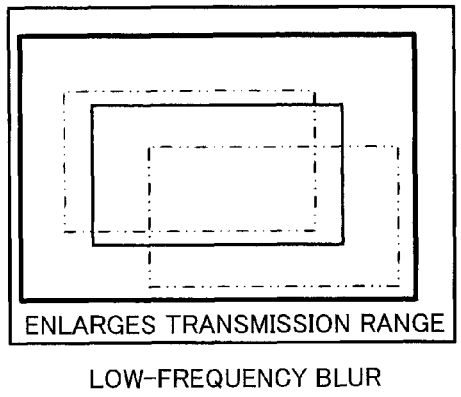
Figure 7D:
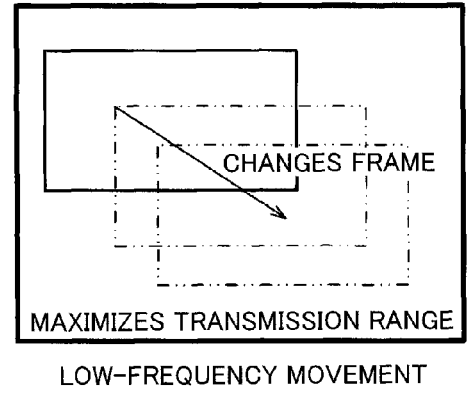

This makes it possible to implement the process illustrated in FIGS. 7B and 7C. It is considered that a low-frequency blur occurs over a wide range as compared with a high-frequency blur. Therefore, it is necessary to provide a large translation blur correction allowance.

The server system may generate the blur determination information based on the image information received via the communication section. The trimming range setting section 120 may receive the blur determination information generated by the server system via a network.

This makes it possible for the information processing device to use the blur determination information transmitted from the server system when the information processing device sets the trimming range. Since the information processing device is required to have a simple configuration, the information processing device may not be provided with a buffer or the like that stores an image. However, since it is necessary to acquire information over a relatively long period in order to detect a low-frequency blur, it is difficult for the information processing device to detect a low-frequency blur. Therefore, the server system may store the image information, and detect a low-frequency blur. The server system may generate the blur determination information, and transmit the blur determination information to the information processing device, and the information processing device may use the received blur determination information when setting the trimming range.

The second embodiment also relates to a server system that includes the blur determination information generation section that generates the blur determination information used to determine whether a translation blur is a high-frequency blur or a low-frequency blur based on the image information. The communication section 210 of the server system transmits the generated blur determination information to the information processing device.

This makes it possible to implement a server system that generates the blur determination information. The advantages obtained when the server system generates blur determination information have been described above.

4. Third Embodiment

Figure 8:
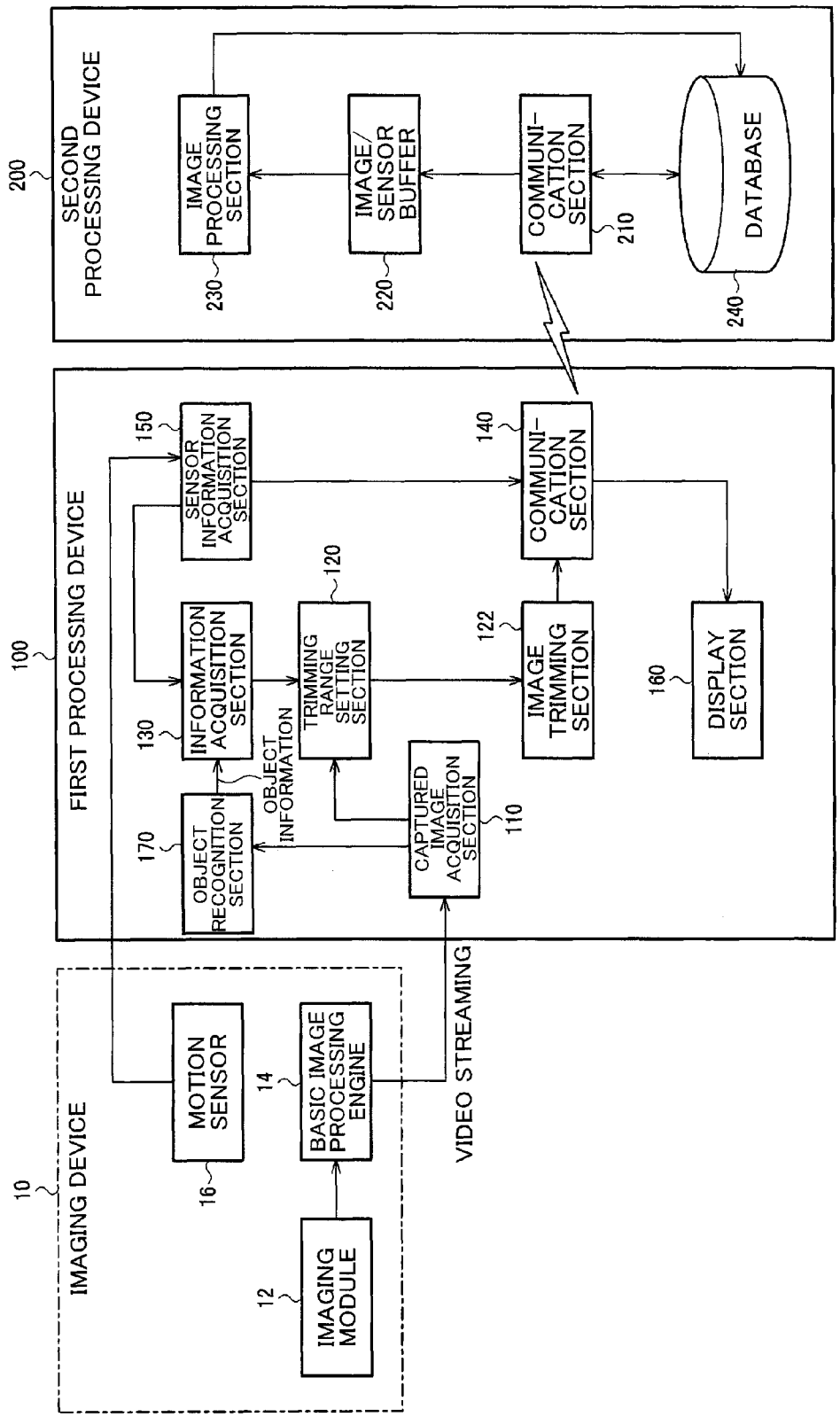
FIG. 8 illustrates a specific system configuration example according to a third embodiment.

An image processing system according to a third embodiment of the invention is described below with reference to FIG. 8. As illustrated in FIG. 8, an imaging device 10 includes an imaging module 12, a basic image processing engine 14, and a motion sensor 16 in the same manner as in the first and second embodiments. The configuration of a second processing device 200 is the same as the configuration of the second processing device 200 according to the first embodiment. Therefore, detailed description of the second processing device 200 is omitted.

The first processing device 100 includes an object recognition section 170. The object recognition section 170 transmits object information (recognition result) to an information acquisition section 130. The object recognition section detects the object from the image data, and acquires the object coordinates and the like. The first processing device 100 tracks the image trimming position based on the acquired object coordinates to control the trimming angle of view.

The sensor used in connection with the third embodiment is limited to the motion sensor. The sensor may be a sensor that recognizes the object, such as an RFID active radar or a pyro electric sensor. In this case, object information is acquired based the sensor information instead of the captured image, differing from the example illustrated in FIG. 8.

The trimming range setting section 120 extracts a periodic change in the object information (e.g., object position/posture data within the image) transmitted from the object recognition section 170 to detect a high-frequency blur and low-frequency blur, calculates a normalized amplitude with respect to the angle of view of the image, reduces the image trimming range when the amplitude is small and only a high-frequency blur component has been detected, and enlarges the image trimming range when the amplitude is large or a large amount of low-frequency blur component has been detected.

Figure 9A:
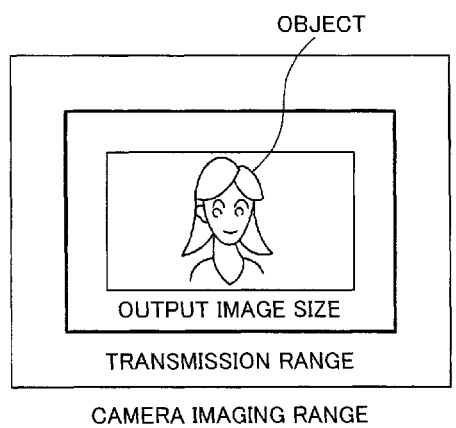
FIGS. 9A to 9D are views illustrating a method that changes a trimming range using object information.
Figure 9B:
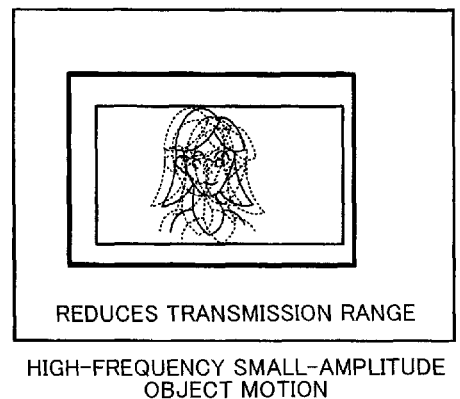
Figure 9C:
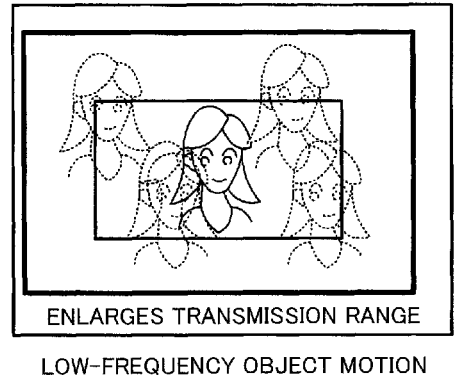
Figure 9D:
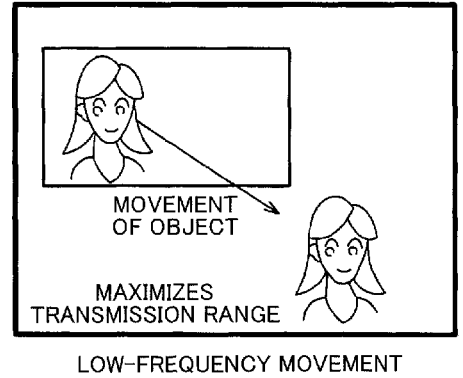

FIGS. 9A to 9D illustrate a camera imaging range (outer rectangular area), a transmission range (rectangular area indicated by a thick line), and an output image size (inner rectangular area). FIG. 9A is a normal state in which the object is stationary. When the motion of the object is small (i.e., high-frequency blur), the transmission range is reduced since the amplitude is small (see FIG. 9B). When the motion of the object is large (i.e., low-frequency blur), the transmission range is enlarged (see FIG. 9C). When the object moves, the transmission range may be enlarged in the direction in which the imaging device 10 may move to follow (track) the object taking account of the motion of the imaging device 10 (see FIG. 9D).

According to the third embodiment, the information acquisition section 130 may acquire the tilt blur information based on object tilt information about the object within the captured image. The trimming range setting section 120 may set the trimming range based on the tilt blur information.

This makes it possible to acquire the tilt blur information based on the object information. The object information may be acquired by performing image processing on the captured image, or may be acquired based on information obtained by a sensor or the like. Since the image processing section 230 of the server system performs the blur correction process in order to reduce the motion of the object within the image, it is very useful to determine the parameter of the blur correction process and the like based on the object information.

The information acquisition section 130 may acquire the translation blur information based on object translation information about the object within the captured image. The trimming range setting section 120 may set the trimming range based on the translation blur information.

This makes it possible to also perform the translation blur correction process based on the object information. The advantages obtained using the object information have been described above.

5. Modifications

In the first to third embodiments, a tilt blur and a translation blur are corrected by performing image processing. Note that image processing may be performed for another purpose. An example in which the trimming range is set taking account of a rolling shutter distortion or a lens distortion is described below.

Figure 10A:
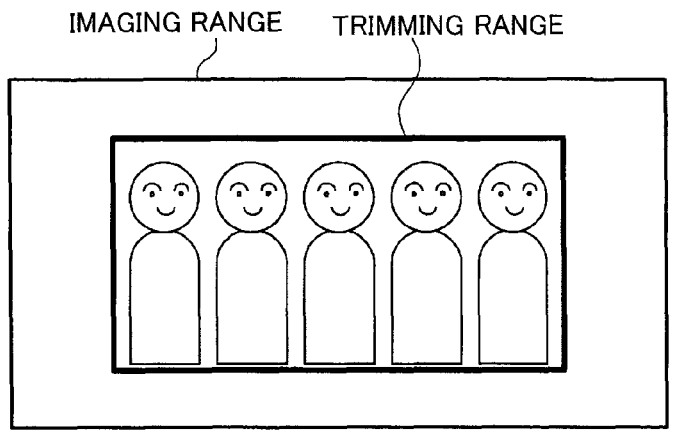
FIG. 10A is a view illustrating an object and a trimming range when a rolling shutter distortion does not occur.
Figure 10B:
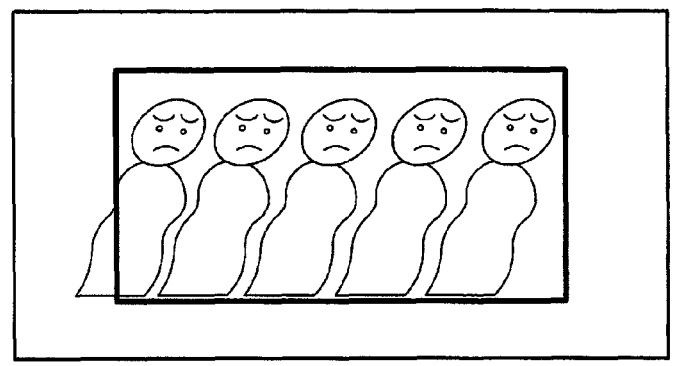
FIG. 10B is a view illustrating an object and a trimming range when a rolling shutter distortion has occurred.
Figure 11:
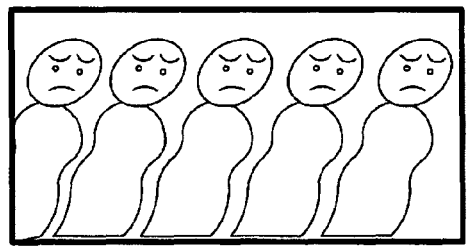
FIG. 11 illustrates an example in which information is lost due to distortion.

A wearable camera may utilize a CMOS sensor as the imaging device 10 in order to achieve a reduction in cost. When using a CMOS sensor, however, the image may be unnecessarily lost by trimming (cropping) due to a rolling shutter distortion. FIGS. 10A, 10B, and 11 illustrate a specific example of such a situation. FIG. 10A illustrates an example in which a rolling shutter distortion does not occur. In this case, an appropriate range can be set as the trimming range. FIG. 10B illustrates an example in which a rolling shutter distortion has occurred. In this case, the objects who stand upright are distorted in a diagonal direction. Therefore, part of the object is removed within the image (see FIG. 11) if the trimming range is set without taking account of the rolling shutter distortion.

Figure 12:
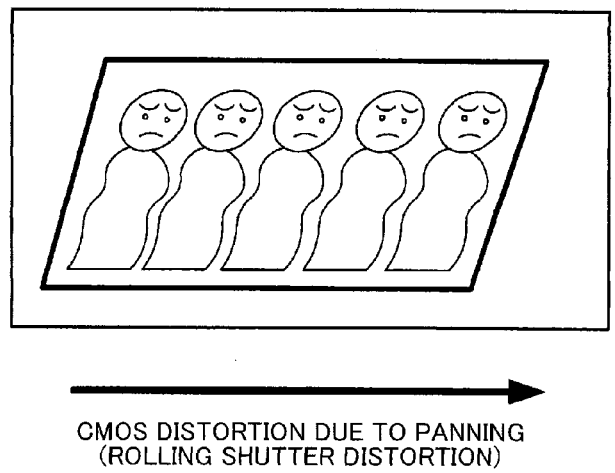
FIG. 12 illustrates an example of a trimming range that takes account of a rolling shutter distortion.
Figure 13:
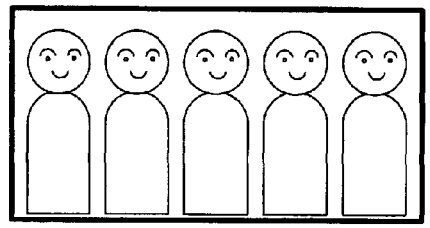
FIG. 13 illustrates an example of an image obtained by performing a correction process on the trimming range illustrated in FIG. 12.

In order to deal with this problem, a parallelogram area (see FIG. 12) is set as the trimming range instead of a rectangular area taking account of the rolling shutter distortion. An appropriate image in which the objects are completely displayed (see FIG. 13) can be acquired by cropping the image using such a trimming range, and performing the blur correction process and the distortion correction process. For example, the amount of distortion may be estimated from the angular velocity measured by a gyrosensor, information about the distance between the AF and the object, and the lens angle of view, and the trimming range may be set based on the resulting information.

Figure 14:
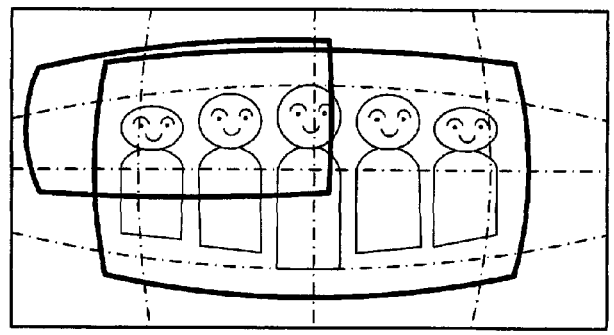
FIG. 14 illustrates an example of a trimming range that takes account of an optical system distortion.
Figure 15:
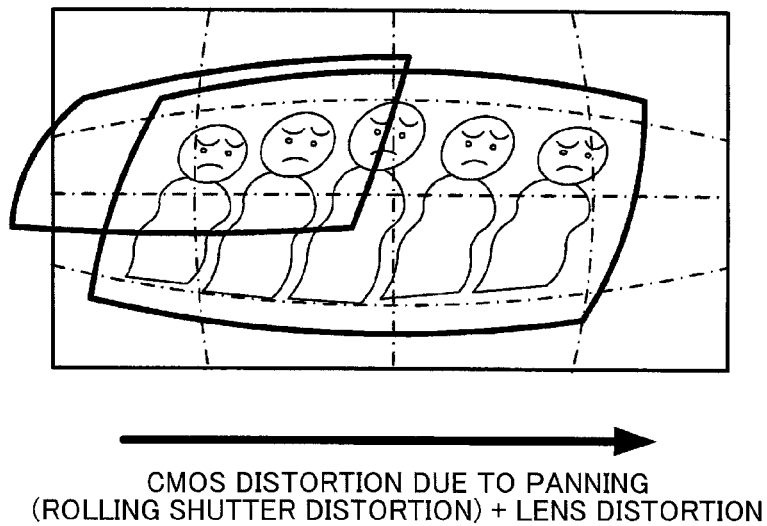
FIG. 15 illustrates an example of a trimming range that takes account of a rolling shutter distortion and an optical system distortion.

An example in which the trimming range is set taking account of a lens distortion is described below. An image may be distorted due to distortion or the like of an optical system. In particular, the peripheral area of the image is significantly distorted. Therefore, it is necessary to set the trimming range in a shape as illustrated in FIG. 14 taking account of the lens distortion. Note that the trimming range may be set taking account of both the rolling shutter distortion and the lens distortion (see FIG. 15).

Figure 16:
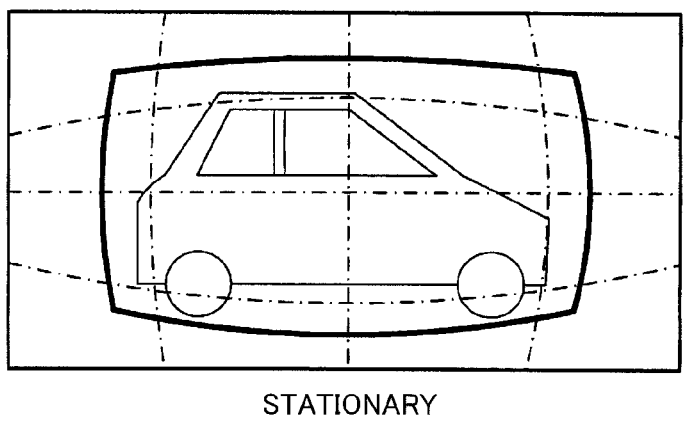
FIG. 16 illustrates an example of an image of a stationary car.
Figure 17:
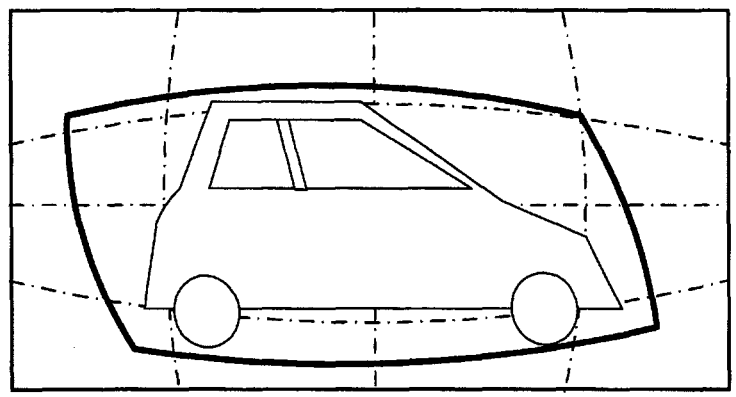
FIG. 17 illustrates an example of a trimming range that takes account of a distortion when capturing a moving car.

It is also necessary to take account of a rolling shutter distortion due to panning when the object moves instead of the imaging device (see FIG. 10B, for example). For example, even if a rolling shutter distortion due to panning does not occur, it is necessary to set the trimming range taking account of a rolling shutter distortion due to the movement of the object (see FIGS. 16 and 17). In this case, the trimming range is deformed taking account of a rolling shutter distortion by recognizing the motion of the object or using the optical flow tendency, for example.

According to the modifications, the trimming range setting section 120 may set an area that includes a distortion correction area used when correcting a distortion of the captured image as the trimming range.

This makes it possible to set the trimming range taking account of a distortion in addition to a blur. For example, when the image is distorted in a diagonal direction (see FIG. 10B), part of the object is removed (see FIG. 11) when setting a rectangular area as the trimming range. In this case, it is desirable to set a trimming range (e.g., parallelogram) that takes account of a distortion.

The distortion of the captured image may be a rolling shutter distortion or an optical system distortion.

This makes it possible to deal with a rolling shutter distortion and an optical system distortion. It is possible to deal with a rolling shutter distortion due to panning (see FIG. 10B) and a rolling shutter distortion due to the movement (motion) of the object (see FIG. 17). Since the degree of optical system distortion can be estimated from the design of the imaging optical system and the like, the trimming range may be set corresponding to the estimated degree of distortion.

The first to third embodiments according to the invention and the modifications thereof have been described above. Note that the invention is not limited to the first and to third embodiments and the modifications thereof. Various modifications and variations may be made without departing from the scope of the invention. A plurality of elements described in connection with the first to third embodiments and the modifications thereof may be appropriately combined to implement various configurations. For example, an arbitrary element may be omitted from the elements described in connection with the first to third embodiments and the modifications thereof. Some of the elements described in connection with different embodiments or modifications thereof may be appropriately combined. Specifically, various modifications and applications are possible without materially departing from the novel teachings and advantages of the invention.

What is claimed is:

1. An information processing device comprising:
    a captured image acquisition section that acquires a captured image from an imaging section;
    a trimming range setting section that sets a trimming range to the captured image acquired by the captured image acquisition section, the trimming range corresponding to an image processing target area that is processed by a server system;
    a communication section that transmits data of an image to the server system via a network, the image corresponding to an area that has been set as the trimming range by the trimming range setting section; and
    an information acquisition section that acquires blur information used for a blur correction process that corrects a blur due to the imaging section,
    wherein the trimming range setting section sets the trimming range employed when performing the blur correction process to be larger than a trimming range employed when not performing the blur correction process by a blur amount specified by the blur information.

2. The information processing device as defined in claim 1,
    wherein the information acquisition section acquires tilt blur information used for a tilt blur correction process that corrects a tilt blur due to the imaging section, and
    wherein the trimming range setting section sets the trimming range employed when performing the tilt blur correction process to be larger than the trimming range employed when not performing the tilt blur correction process by a tilt blur amount specified by the tilt blur information.

3. The information processing device as defined in claim 2, further comprising:
    a sensor information acquisition section that acquires sensor information from a motion sensor of the imaging section,
    wherein the information acquisition section acquires the tilt blur information based on the sensor information.

4. The information processing device as defined in claim 2,
    the information acquisition section acquiring the tilt blur information based on object tilt information about an object within the captured image, and
    the trimming range setting section setting the trimming range based on the tilt blur information.

5. The information processing device as defined in claim 2, wherein the communication section adds the tilt blur information to the data of the image and transmits the resulting data of the image to the server system.

6. The information processing device as defined in claim 1,
    wherein the information acquisition section acquires translation blur information used for a translation blur correction process that corrects a translation blur due to the imaging section, and
    wherein the trimming range setting section sets the trimming range employed when performing the translation blur correction process to be larger than the trimming range employed when not performing the translation blur correction process by a translation blur amount specified by the translation blur information.

7. The information processing device as defined in claim 6, further comprising:
    a sensor information acquisition section that acquires sensor information from a motion sensor of the imaging section,
    wherein the information acquisition section acquires the translation blur information based on the sensor information.

8. The information processing device as defined in claim 6,
    the information acquisition section acquiring the translation blur information based on object translation information about an object within the captured image, and
    the trimming range setting section setting the trimming range based on the translation blur information.

9. The information processing device as defined in claim 6, wherein the communication section adds the translation blur information to the data of the image and transmits the resulting data of the image to the server system.

10. The information processing device as defined in claim 6, the trimming range setting section acquiring blur determination information used to determine whether the translation blur due to the imaging section is a high-frequency blur or a low-frequency blur, and enlarging the trimming range when it has been determined that the translation blur is the low-frequency blur based on the acquired blur determination information as compared with a case where it has been determined that the translation blur is the high-frequency blur.

11. The information processing device as defined in claim 10,
    the server system generating the blur determination information based on the image information received via the communication section, and
    the trimming range setting section receiving the blur determination information generated by the server system via the network.

12. The information processing device as defined in claim 1, the trimming range setting section setting an area that includes a distortion correction area used when correcting a distortion of the captured image as the trimming range.

13. The information processing device as defined in claim 12, the distortion of the captured image being a rolling shutter distortion due to an image sensor of the imaging section.

14. The information processing device as defined in claim 12, the distortion of the captured image being a distortion due to an optical property of the imaging section.

15. An image processing system comprising:
an information processing device; and
a server system,
wherein the information processing device comprises:
- a captured image acquisition section that acquires a captured image from an imaging section;
- a trimming range setting section that sets a trimming range to the captured image acquired by the captured image acquisition section, the trimming range corresponding to an image processing target area that is processed by the server system; and
- a first communication section that transmits data of an image to the server system via a network, the image corresponding to an image of area that has been set as the trimming range by the trimming range setting section:
- an information acquisition section that acquires blur information used for a blur correction process that corrects a blur due to the imaging section,
- wherein the trimming range setting section sets the trimming range employed when performing the blur correction process to be larger than a trimming range employed when not performing the blur correction process by a blur amount specified by the blur information; and wherein the server system comprises:
- a second communication section that receives the data of the image and a parameter used when setting the trimming range from the information processing device via the network; and
- an image processing section that performs a correction process on the data of the image based on the parameter.

16. A non-transitory information storage device storing a program that causes a computer to function as:
- a captured image acquisition section that acquires a captured image from an imaging section;
- a trimming range setting section that sets a trimming range to the captured image acquired by the captured image acquisition section, the trimming range corresponding to an image processing target area that is processed by a server system;
- a communication section that transmits data of an image to the server system via a network, the image corresponding to an image of area that has been set as the trimming range by the trimming range setting section; and
- an information acquisition section that acquires blur information used for a blur correction process that corrects a blur due to the imaging section,
- wherein the trimming range setting section sets the trimming range employed when performing the blur correction process to be larger than a trimming range employed when not performing the blur correction process by a blur amount specified by the blur information.

* * * * *